US012190780B2

(12) United States Patent
Feng et al.

(10) Patent No.: US 12,190,780 B2
(45) Date of Patent: Jan. 7, 2025

(54) GOA CIRCUIT AND DISPLAY PANEL

(71) Applicant: SHENZHEN CHINA STAR OPTOELECTRONICS SEMICONDUCTOR DISPLAY TECHNOLOGY CO., LTD., Shenzhen (CN)

(72) Inventors: Tuo Feng, Shenzhen (CN); Xianjin Ge, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/600,332

(22) PCT Filed: Sep. 8, 2021

(86) PCT No.: PCT/CN2021/117083
§ 371 (c)(1),
(2) Date: Sep. 30, 2021

(87) PCT Pub. No.: WO2022/252427
PCT Pub. Date: Dec. 8, 2022

(65) Prior Publication Data

US 2024/0046844 A1 Feb. 8, 2024

(30) Foreign Application Priority Data

Jun. 1, 2021 (CN) ........................ 202110610625.X

(51) Int. Cl.
*G09G 3/20* (2006.01)

(52) U.S. Cl.
CPC ... *G09G 3/2092* (2013.01); *G09G 2310/0267* (2013.01); *G09G 2310/08* (2013.01)

(58) Field of Classification Search
CPC ......... G09G 3/2092; G09G 2310/0267; G09G 2310/08; G09G 2300/0408;
(Continued)

(56) References Cited

U.S. PATENT DOCUMENTS

2019/0206503 A1* 7/2019 Zhang ...................... G09G 3/20
2020/0035179 A1* 1/2020 Chen .................... G09G 3/3648
2020/0035180 A1* 1/2020 Chen .................... G09G 3/3677

FOREIGN PATENT DOCUMENTS

CN 104050941 A 9/2014
CN 104392700 A 3/2015
(Continued)

OTHER PUBLICATIONS

International Search Report in International application No. PCT/CN2021/117083, mailed on Feb. 22, 2022.
(Continued)

*Primary Examiner* — Adam R. Giesy
(74) *Attorney, Agent, or Firm* — PV IP PC; Wei Te Chung

(57) ABSTRACT

Disclosed are a GOA circuit and a display panel. The gate driver on array circuit comprises a plurality of GOA units, which is cascaded, and a nth stage GOA unit comprises: a pull-down module, pulling down a pull-up control signal and a nth stage gate drive signal to a low potential when the scanning is completed; and a pull-down maintaining module, maintaining the pull-up control signal and the nth stage gate drive signal at the low potential according to a nth stage non-inverting clock signal and a nth inverting clock signal.

18 Claims, 1 Drawing Sheet

(58) Field of Classification Search
CPC ............. G09G 2310/0286; G09G 3/36; G09G 3/3677; G09G 3/20
See application file for complete search history.

(56) References Cited

FOREIGN PATENT DOCUMENTS

| | | | |
|---|---|---|---|
| CN | 107086028 | A | 8/2017 |
| CN | 109036307 | A | 12/2018 |
| CN | 109256079 | A | 1/2019 |
| CN | 113362752 | A | 9/2021 |

OTHER PUBLICATIONS

Written Opinion of the International Search Authority in International application No. PCT/CN2021/117083, mailed on Feb. 22, 2022.
Chinese Office Action issued in corresponding Chinese Patent Application No. 202110610625.X dated Jun. 15, 2022, pp. 1-8.

* cited by examiner

GOA CIRCUIT AND DISPLAY PANEL

RELATED APPLICATIONS

This application is a Notional Phase of PCT Patent Application No. PCT/CN2021/117083 having international filing date Sep. 8, 2021, which claims the benefit of priority of Chinese Patent Application No. 202110610625.X filed on Jun. 1, 2021. The contents of the above applications are all incorporated by reference as if fully set forth herein in their entirety.

FIELD OF THE INVENTION

The present application relates to a display panel technology field, and more particularly to a GOA circuit and a display panel.

BACKGROUND OF THE INVENTION

In the display panel, the GOA (Gate Driver on Array) circuit is provided with a pull-down maintaining module, which is employed to maintain the gate drive signal of the GOA unit at a low potential after the scanning of the GOA unit of one stage is completed. However, in order to realize the pull-down maintaining function of the pull-down maintaining module in the prior art, it needs to separately input multiple low-frequency voltage signals to the pull-down maintaining module, and the input of multiple low-frequency voltage signals requires additional signal lines in the display panel. The complexity of the GOA circuit is increased, and multiple signal lines are arranged at the frame of the display panel, which increases the frame width of the display panel.

SUMMARY OF THE INVENTION

The embodiment of the present application provides a GOA circuit and a display panel, which can simplify the GOA circuit and reduce a frame width of the display panel.

The embodiment of the present application provides a gate driver on array (GOA) circuit, comprising a plurality of GOA units, which is cascaded, and a nth stage GOA unit comprises:

a pull-up control module, outputting a pull-up control signal of a high potential according to a n−bth stage transfer signal and a n−bth stage gate drive signal when scanning starts;

an output module, outputting a nth stage gate drive signal of the high potential according to the pull-up control signal of the high potential and a nth stage non-inverting clock signal;

a pull-down module, pulling down the pull-up control signal outputted by the pull-up control module and the nth stage gate drive signal outputted by the output module to a low potential according to a n+bth stage gate drive signal when the scanning is completed; and a pull-down maintaining module, maintaining the pull-up control signal outputted by the pull-up control module and the nth stage gate drive signal outputted by the output module at the low potential according to the nth stage non-inverting clock signal and a nth inverting clock signal. The nth stage non-inverting clock signal and the nth inverting clock signal are mutually inverted signals.

Optionally, the pull-down maintaining module comprises a first pull-down maintaining unit and a second pull-down maintaining unit;

the pull-down maintaining module is further employed to maintain the pull-up control signal and the nth stage gate drive signal at the low potential by the first pull-down maintaining unit when the nth stage non-inverting clock signal is at the low potential, and the nth stage inverting clock signal is at the high potential; and to maintain the pull-up control signal and the nth stage gate drive signal at the low potential by the second pull-down maintaining unit when the nth stage non-inverting clock signal is at the high potential, and the nth stage inverting clock signal is at the low potential.

Optionally, the first pull-down maintaining unit comprises a first switch transistor and a second switch transistor;

the first pull-down maintaining unit is employed to control the first switch transistor to turn on according to the nth stage inverting clock signal of the high potential, so as to maintain the nth stage gate drive signal at the low potential, and to control the second switch transistor to be turn on to maintain the pull-up control signal at the low potential; and to control the first switch transistor and the second switch transistor to turn off according to the nth stage inverting clock signal of the low potential.

Optionally, the first pull-down maintaining unit further comprises a third switch transistor, a fourth switch transistor, a fifth switch transistor and a sixth switch transistor;

a gate and a drain of the third switch transistor are connected to the nth stage inverting clock signal, a source of the third switch transistor is respectively connected to a drain of the fourth switch transistor and a gate of the fifth switch transistor respectively, and a gate of the fourth switch transistor is connected to the pull-up control signal, a source of the fourth switch transistor is connected to a first low potential, and a drain of the fifth switch transistor is connected to the nth inverting clock signal, a source of the fifth switch transistor is connected to a drain of the sixth switch transistor, a gate of the first switch transistor and a gate of the second switch transistor respectively, a source of the sixth switch transistor is connected to the first low potential;

a drain of the first switch transistor is connected to the nth stage gate drive signal, a source of the first switch transistor is connected to a second low potential, and a drain of the second switch transistor is connected to the pull-up control signal, a source of the second switch transistor is connected to the first low potential.

Optionally, the second pull-down maintaining unit comprises a seventh switch transistor and an eighth switch transistor;

the second pull-down maintaining unit is employed to control the seventh switch transistor to turn on according to the nth stage non-inverting clock signal of the high potential, so as to maintain the nth stage gate drive signal at the low potential, and to control the eighth switch transistor to turn on to maintain the pull-up control signal at the low potential; and to control the seventh switch transistor and the eighth switch transistor to turn off according to the nth stage non-inverting clock signal of the low potential.

Optionally, the second pull-down maintaining unit further comprises a ninth switch transistor, a tenth switch transistor, an eleventh switch transistor and a twelfth switch transistor;

a drain and a gate of the ninth switch transistor is connected to the nth stage non-inverting clock signal, a source of the ninth switch transistor is connected to a drain of the tenth switch transistor and a gate of the eleventh switch transistor respectively, and a gate of the tenth switch transistor is connected to the pull-up control signal, a source of the tenth switch transistor is connected to a first low potential; a drain of the eleventh switch transistor is connected to the nth stage non-inverting clock signal, a source of the eleventh switch transistor is connected to a drain of the twelfth switch transistor, a gate of the seventh switch transistor and a gate of the eighth switch transistor respectively, and a gate of the twelfth switch transistor is connected to the pull-up control signal, a source of the twelfth switch transistor is connected to the first low potential;

a drain of the seventh switch transistor is connected to the nth stage gate drive signal, a source of the seventh switch transistor is connected to a second low potential; a drain of the eighth switch transistor is connected to the pull-up control signal, a source of the eighth switch transistor is connected to the first low potential.

Optionally, the pull-up control module comprises a thirteenth switch transistor;

a drain of the thirteenth switch transistor is connected to the n−bth stage gate drive signal, a gate of the thirteenth switch transistor is connected to the n−bth stage transfer signal, a source of the thirteenth switch transistor is connected to the pull-up control signal.

Optionally, the output module comprises a fourteenth switch transistor, a fifteenth switch transistor and a bootstrap capacitor;

a drain of the fourteenth switch transistor is connected to the nth stage non-inverting clock signal, a gate of the fourteenth switch transistor is connected to the pull-up control signal, one end of the bootstrap capacitor and the other end of the bootstrap capacitor respectively, a source of the fourteenth switch transistor is connected to the nth stage gate drive signal; a drain of the fifteenth switch transistor is connected to the nth stage non-inverting clock signal, a gate of the fifteenth switch transistor is connected to the pull-up control signal, a source of the fifteenth switch transistor is connected to a nth stage transfer signal.

Optionally, the pull-down module comprises a sixteenth switch transistor and a seventeenth switch transistor;

a drain of the sixteenth switch transistor is connected to the nth stage gate drive signal, a gate of the sixteenth switch transistor is connected to a n+bth stage gate drive signal, a source of the sixteenth switch transistor is connected to a second low potential; a drain of the seventeenth switch transistor is connected to the pull-up control signal, a gate of the seventeenth switch transistor is connected to the n+bth stage gate drive signal, a source of the seventeenth switch transistor is connected to a first low potential.

The embodiment of the present application further provides a display panel, comprising a gate driver on array (GOA) circuit, and the GOA circuit comprises a plurality of GOA units, which is cascaded, and a nth stage GOA unit comprises:

a pull-up control module, outputting a pull-up control signal of a high potential according to a n−bth stage transfer signal and a n−bth stage gate drive signal when scanning starts;

an output module, outputting a nth stage gate drive signal of the high potential according to the pull-up control signal of the high potential and a nth stage non-inverting clock signal;

a pull-down module, pulling down the pull-up control signal outputted by the pull-up control module and the nth stage gate drive signal outputted by the output module to a low potential according to a n+bth stage gate drive signal when the scanning is completed; and a pull-down maintaining module, maintaining the pull-up control signal outputted by the pull-up control module and the nth stage gate drive signal outputted by the output module at the low potential according to the nth stage non-inverting clock signal and a nth inverting clock signal.

Optionally, the pull-down maintaining module comprises a first pull-down maintaining unit and a second pull-down maintaining unit;

the pull-down maintaining module is further employed to maintain the pull-up control signal and the nth stage gate drive signal at the low potential by the first pull-down maintaining unit when the nth stage non-inverting clock signal is at the low potential, and the nth stage inverting clock signal is at the high potential; and to maintain the pull-up control signal and the nth stage gate drive signal at the low potential by the second pull-down maintaining unit when the nth stage non-inverting clock signal is at the high potential, and the nth stage inverting clock signal is at the low potential.

Optionally, the first pull-down maintaining unit comprises a first switch transistor and a second switch transistor;

the first pull-down maintaining unit is employed to control the first switch transistor to turn on according to the nth stage inverting clock signal of the high potential, so as to maintain the nth stage gate drive signal at the low potential, and to control the second switch transistor to be turn on to maintain the pull-up control signal at the low potential; and to control the first switch transistor and the second switch transistor to turn off according to the nth stage inverting clock signal of the low potential.

Optionally, the first pull-down maintaining unit further comprises a third switch transistor, a fourth switch transistor, a fifth switch transistor and a sixth switch transistor;

a gate and a drain of the third switch transistor are connected to the nth stage inverting clock signal, a source of the third switch transistor is respectively connected to a drain of the fourth switch transistor and a gate of the fifth switch transistor respectively, and a gate of the fourth switch transistor is connected to the pull-up control signal, a source of the fourth switch transistor is connected to a first low potential, and a drain of the fifth switch transistor is connected to the nth inverting clock signal, a source of the fifth switch transistor is connected to a drain of the sixth switch transistor, a gate of the first switch transistor and a gate of the second switch transistor respectively, a source of the sixth switch transistor is connected to the first low potential;

a drain of the first switch transistor is connected to the nth stage gate drive signal, a source of the first switch transistor is connected to a second low potential, and a drain of the second switch transistor is connected to the pull-up control signal, a source of the second switch transistor is connected to the first low potential.

Optionally, the second pull-down maintaining unit comprises a seventh switch transistor and an eighth switch transistor;

the second pull-down maintaining unit is employed to control the seventh switch transistor to turn on according to the nth stage non-inverting clock signal of the high potential, so as to maintain the nth stage gate drive signal at the low potential, and to control the eighth switch transistor to turn on to maintain the pull-up control signal at the low potential; and to control the seventh switch transistor and the eighth switch transistor to turn off according to the nth stage non-inverting clock signal of the low potential.

Optionally, the second pull-down maintaining unit further comprises a ninth switch transistor, a tenth switch transistor, an eleventh switch transistor and a twelfth switch transistor;

a drain and a gate of the ninth switch transistor is connected to the nth stage non-inverting clock signal, a source of the ninth switch transistor is connected to a drain of the tenth switch transistor and a gate of the eleventh switch transistor respectively, and a gate of the tenth switch transistor is connected to the pull-up control signal, a source of the tenth switch transistor is connected to a first low potential; a drain of the eleventh switch transistor is connected to the nth stage non-inverting clock signal, a source of the eleventh switch transistor is connected to a drain of the twelfth switch transistor, a gate of the seventh switch transistor and a gate of the eighth switch transistor respectively, and a gate of the twelfth switch transistor is connected to the pull-up control signal, a source of the twelfth switch transistor is connected to the first low potential;

a drain of the seventh switch transistor is connected to the nth stage gate drive signal, a source of the seventh switch transistor is connected to a second low potential; a drain of the eighth switch transistor is connected to the pull-up control signal, a source of the eighth switch transistor is connected to the first low potential.

Optionally, the pull-up control module comprises a thirteenth switch transistor;

a drain of the thirteenth switch transistor is connected to the n−bth stage gate drive signal, a gate of the thirteenth switch transistor is connected to the n−bth stage transfer signal, a source of the thirteenth switch transistor is connected to the pull-up control signal.

Optionally, the output module comprises a fourteenth switch transistor, a fifteenth switch transistor and a bootstrap capacitor;

a drain of the fourteenth switch transistor is connected to the nth stage non-inverting clock signal, a gate of the fourteenth switch transistor is connected to the pull-up control signal, one end of the bootstrap capacitor and the other end of the bootstrap capacitor respectively, a source of the fourteenth switch transistor is connected to the nth stage gate drive signal; a drain of the fifteenth switch transistor is connected to the nth stage non-inverting clock signal, a gate of the fifteenth switch transistor is connected to the pull-up control signal, a source of the fifteenth switch transistor is connected to a nth stage transfer signal.

Optionally, the pull-down module comprises a sixteenth switch transistor and a seventeenth switch transistor;

a drain of the sixteenth switch transistor is connected to the nth stage gate drive signal, a gate of the sixteenth switch transistor is connected to a n+bth stage gate drive signal, a source of the sixteenth switch transistor is connected to a second low potential; a drain of the seventeenth switch transistor is connected to the pull-up control signal, a gate of the seventeenth switch transistor is connected to the n+bth stage gate drive signal, a source of the seventeenth switch transistor is connected to a first low potential.

The benefits of the present application are: during the scanning period, the pull-up control module outputs a pull-up control signal of a high potential according to a n−bth stage transfer signal and a n−bth stage gate drive signal. The output module outputs a nth stage gate drive signal of the high potential according to the pull-up control signal of the high potential and a nth stage non-inverting clock signal. The pull-down module pulls the pull-up control signal and the nth stage gate drive signal to a low potential according to a n+bth stage gate drive signal when the scanning is completed. The pull-down maintaining module maintains the pull-up control signal and the nth stage gate drive signal at the low potential according to the nth stage non-inverting clock signal and a nth inverting clock signal. There is no need to set a separate signal line for the pull-down maintaining module, thus to simplify the GOA circuit and reduce the space occupied by the GOA circuit to diminish the frame width of the display panel.

BRIEF DESCRIPTION OF THE DRAWINGS

The technical solution and the beneficial effects of the present application are best understood from the following detailed description with reference to the accompanying figures and embodiments.

DETAILED DESCRIPTION OF PREFERRED EMBODIMENTS

Figure 1:
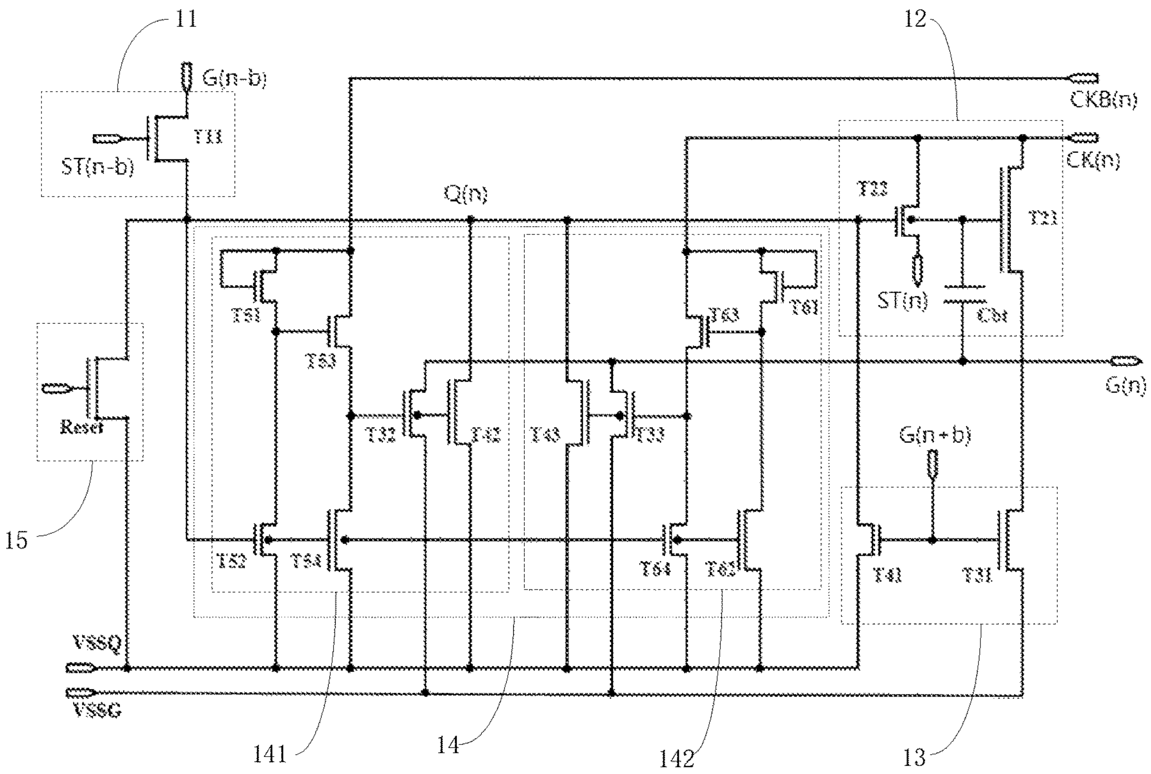
FIG. 1 is a schematic structural diagram of a GOA circuit provided by an embodiment of the application.

The specific structural and functional details disclosed here are merely representative and are used for the purpose of describing exemplary embodiments of the present application. However, the present application may be embodied in many alternative forms and should not be construed as being limited only to the embodiments set forth herein.

In the description of the present application, it is to be understood that the terms "center", "transverse", "upper", "lower", "left", "right", "vertical", "horizontal", "top", "bottom", "inside", "outside", etc. are positional relationships based on the orientations or positional relationships shown in the drawings, and are merely for the convenience of the description of the present application and the simplified description, and do not indicate or imply that the device or component referred to have specific orientations, and are constructed and operated in specific orientations. Therefore, these should not be construed as limiting the present application. Moreover, the terms "first" and "second" are used for descriptive purposes only and are not to be construed as indicating or implying a relative importance or implicitly indicating the number of indicated technical features. Thus, features defining "first" and "second" may include one or more of the features with either explicitly or implicitly. In the description of the present application, unless with being indicated otherwise, "plurality" means two or more. Furthermore, the terms "comprise" and its any deformations are intended to cover non-exclusive inclusion.

In the description of the present application, which needs explanation is that the term "installation", "connected", "connection" should be broadly understood unless those are clearly defined and limited, otherwise, For example, those can be a fixed connection, a detachable connection, or an integral connection; those can be a mechanical connection or an electrical connection; those can be a direct connection, or an indirect connection with an intermediary, which may be an internal communication of two elements. To those of ordinary skill in the art, the specific meaning of the above terminology in the present application can be understood in the specific circumstances.

The terms used herein are only for describing specific embodiments and are not intended to limit the exemplary embodiments. Unless the context clearly dictates otherwise, the singular forms “a” and “one” used herein are also intended to include the plural. It should also be understood that the terms “include” and/or “comprise” used herein specify the existence of the stated features, integers, steps, operations, units and/or components, and do not exclude the existence or addition of one or more other features, integers, steps, operations, units, components and/or combinations thereof.

The present application will be further described in detail with the accompanying drawings and the specific embodiments.

Please refer to FIG. 1, which is a schematic structural diagram of a GOA circuit provided by an embodiment of the application.

The gate driver on array (GOA) circuit provided by the embodiment of the present application comprises a plurality of GOA units, which is cascaded. A nth stage GOA unit comprises a pull-up control module 11, an output module 12, a pull-down module 13 and a pull-down maintaining module 14. n>b, and b can be 1, 2, 3, 4, etc.

The pull-up control module 11 outputs a pull-up control signal Q(n) of a high potential according to a n−bth stage transfer signal ST(n−b) and a n−bth stage gate drive signal G(n−b) when scanning starts.

When scanning starts, the pull-up control module 11 is inputted with the n−bth stage transfer signal ST(n−b) of the high potential and the n−bth stage gate drive signal G(n−b) of the high potential to turn on the pull-up control module 11, so that the pull-up control module 11 outputs pull-up control signal Q(n) of the high potential.

Specifically, the pull-up control module comprises a thirteenth switch transistor T11; A drain of the thirteenth switch transistor T11 is connected to the n−bth stage gate drive signal G(n−b), a gate of the thirteenth switch transistor T11 is connected to the n−bth stage transfer signal ST(n−b), a source of the thirteenth switch transistor T11 is connected to the pull-up control signal Q(n).

When scanning starts, the gate of the thirteenth switch transistor T11 is inputted with the n−bth stage transfer signal ST(n−b) of the high potential, and the drain of the thirteenth switch transistor T11 is inputted with the n−bth stage gate drive signal G(n−b) of the high potential. The thirteenth switch transistor T11 is turned on, so that the source of the thirteenth switch transistor T11 outputs the pull-up control signal Q(n) of the high potential.

The output module 12 is employed to output a nth stage gate drive signal G(n) of the high potential according to the pull-up control signal Q(n) of the high potential and a nth stage non-inverting clock signal CK(n).

The pull-up control signal Q(n) can control the on or off of the output module 12. When the pull-up control signal Q(n) is at the high potential, the output module 12 is turned on; when the pull-up control signal Q(n) is at the low potential, the output module 12 is turned off. When the output module 12 is turned on, the output module 12 is inputted with the nth stage non-inverting clock signal CK(n) of the high potential, so that the output module 12 outputs the nth stage gate drive signal G(n) of the high potential.

Specifically, the output module 12 comprises a fourteenth switch transistor T21, a fifteenth switch transistor T22 and a bootstrap capacitor Cbt; a drain of the fourteenth switch transistor T21 is connected to the nth stage non-inverting clock signal CK(n), a gate of the fourteenth switch transistor T21 is connected to the pull-up control signal Q(n), one end of the bootstrap capacitor Cbt and the other end of the bootstrap capacitor Cbt respectively, a source of the fourteenth switch transistor T21 is connected to the nth stage gate drive signal G(n); a drain of the fifteenth switch transistor T22 is connected to the nth stage non-inverting clock signal CK(n), a gate of the fifteenth switch transistor T22 is connected to the pull-up control signal Q(n), a source of the fifteenth switch transistor T22 is connected to a nth stage transfer signal ST(n).

When the pull-up control signal Q(n) is at the high potential, the fourteenth switch transistor T21 and the fifteenth switch transistor T22 are turned on. If the nth stage non-inverting clock signal CK(n) is at the high potential, the nth stage transfer signal ST(n) is at the high potential and the nth stage gate drive signal G(n) is at the high potential.

The pull-down module 13 is employed to pull down the pull-up control signal Q(n) outputted by the pull-up control module and the nth stage gate drive signal G(n) outputted by the output module to a low potential according to a n+bth stage gate drive signal G(n+b) when the scanning is completed.

When the scanning is completed, the pull-down module 13 is inputted with the n+bth stage gate drive signal G(n+b) of the high potential to turn on the pull-down module 13, and the pull-down module 13 is connected to a first low potential VSSQ and a second low potential VSSG to pull down the pull-up control signal Q(n) to the first low potential VSSQ, and to pull down the nth stage gate drive signal G(n) to the second low potential VSSG. The first low potential VSSQ and the second low potential VSSG are constant low potentials.

Specifically, the pull-down module 13 comprises a sixteenth switch transistor T31 and a seventeenth switch transistor T41; a drain of the sixteenth switch transistor T31 is connected to the nth stage gate drive signal G(n), a gate of the sixteenth switch transistor T31 is connected to a n+bth stage gate drive signal G(n+b), a source of the sixteenth switch transistor T31 is connected to the second low potential VSSG; a drain of the seventeenth switch transistor T41 is connected to the pull-up control signal Q(n), a gate of the seventeenth switch transistor T41 is connected to the n+bth stage gate drive signal G(n+b), a source of the seventeenth switch transistor T41 is connected to the first low potential VSSQ.

When the scanning is completed, the n+bth stage gate drive signal G(n+b) is at the high potential and the sixteenth switch transistor T31 is turned on to pull down the nth stage gate drive signal G(n) from the high potential to the second low potential VSSG, and meanwhile, the seventeenth switch transistor T41 is turned on to pull down the pull-up control signal Q(n) from the high potential to the first low potential VSSQ.

The pull-down maintaining module 14 is employed to maintain the pull-up control signal Q(n) and the nth stage gate drive signal G(n) at the low potential according to the nth stage non-inverting clock signal CK(n) and a nth inverting clock signal CKB(n). The nth stage non-inverting clock signal CK(n) and the nth inverting clock signal CKB(n) are mutually inverted signals.

When the nth stage non-inverting clock signal CK(n) is at the high potential, the nth inverting clock signal CKB(n) is at the low potential; when the nth stage non-inverting clock signal CK(n) is at the low potential, the nth inverting clock signal CKB(n) is at the high potential. When the pull-down maintaining module 14 is inputted with either the nth stage non-inverting clock signal CK(n) of the high potential or the nth inverting clock signal CKB(n) of the high potential, the pull-down maintaining module 14 can pull down the pull-up control signal Q(n) to the first low potential VSSQ and pull down the nth stage gate drive signal G(n) to the second low potential VSSG.

The pull-down maintaining module 14 comprises a first pull-down maintaining unit 141 and a second pull-down maintaining unit 142; the pull-down maintaining module 14 is further employed to maintain the pull-up control signal Q(n) and the nth stage gate drive signal G(n) at the low potential by the first pull-down maintaining unit 141 when the nth stage non-inverting clock signal CK(n) is at the low potential, and the nth stage inverting clock signal CKB(n) is at the high potential; and to maintain the pull-up control signal Q(n) and the nth stage gate drive signal G(n) at the low potential by the second pull-down maintaining unit 142 when the nth stage non-inverting clock signal CK(n) is at the high potential, and the nth stage inverting clock signal CKB(n) is at the low potential.

In order to prevent the switch transistor in the pull-down maintaining module 14 from constantly working to generate a bias voltage, two pull-down maintaining units are designed to work alternately in the pull-down maintaining module 14. Namely, the first pull-down maintaining unit 141 and the second pull-down maintaining unit 142 are respectively inputted with the nth stage non-inverting clock signal CK(n) and the nth stage inverting clock signal CKB(n) that are mutually inverted signals, so that the first pull-down maintaining unit 141 and the second pull-down maintaining unit 142 work alternately. When the nth stage non-inverting clock signal CK(n) is at the high potential, the nth inverting clock signal CKB(n) is at the low potential, the second pull-down maintaining unit 142 does not work and the first pull-down maintaining unit 141 works to maintain the pull-up control signal Q(n) and the nth stage gate drive signal G(n) at the low potential; when the nth inverting clock signal CKB(n) is at the high potential, the nth stage non-inverting clock signal CK(n) is at the low potential, the first pull-down maintaining unit 141 does not work and the second pull-down maintaining unit 142 works to maintain the pull-up control signal Q(n) and the nth stage gate drive signal G(n) at the low potential.

The first pull-down maintaining unit 141 comprises a first switch transistor T32 and a second switch transistor T42; the first pull-down maintaining unit 141 is employed to control the first switch transistor T32 to turn on according to the nth stage inverting clock signal CKB(n) of the high potential, so as to maintain the nth stage gate drive signal G(n) at the low potential, and to control the second switch transistor T42 to be turn on to maintain the pull-up control signal Q(n) at the low potential; and to control the first switch transistor T32 and the second switch transistor T42 to turn off according to the nth stage inverting clock signal CKB(n) of the low potential.

Specifically, the first pull-down maintaining unit 141 further comprises a third switch transistor T51, a fourth switch transistor T52, a fifth switch transistor T53 and a sixth switch transistor T54; a gate and a drain of the third switch transistor T51 are connected to the nth stage inverting clock signal CKB(n), a source of the third switch transistor T51 is respectively connected to a drain of the fourth switch transistor T52 and a gate of the fifth switch transistor T53 respectively, and a gate of the fourth switch transistor T52 is connected to the pull-up control signal Q(n), a source of the fourth switch transistor T52 is connected to a first low potential VSSQ, and a drain of the fifth switch transistor T53 is connected to the nth inverting clock signal CKB(n), a source of the fifth switch transistor T53 is connected to a drain of the sixth switch transistor T54, a gate of the first switch transistor T32 and a gate of the second switch transistor T42 respectively, and a source of the sixth switch transistor T54 is connected to the first low potential VSSQ; a drain of the first switch transistor T32 is connected to the nth stage gate drive signal G(n), a source of the first switch transistor T32 is connected to a second low potential VSSG, and a drain of the second switch transistor T42 is connected to the pull-up control signal Q(n), a source of the second switch transistor T42 is connected to the first low potential VSSQ.

Preferably, the third switch transistor T51, the fourth switch transistor T52, the fifth switch transistor T53 and the sixth switch transistor T54 may constitute a first inverter. When the first pull-down maintaining unit 141 is inputted with the nth inverting clock signal CKB(n) of the high potential, i.e. the first inverter is inputted with the nth inverting clock signal CKB(n) of the high potential, the third switch transistor T51 is turned on, so as to turn on the fifth switch transistor T53. That is, the first inverter works so as to turn on the first switch transistor T32 and the second switch transistor T42. Then, turning on the first switch transistor T32 will maintain the nth stage gate drive signal G(n) at the second low potential VSSG, and turning on the second switch transistor T42 will maintain the pull-up control signal Q(n) at the first low potential VSSQ.

When the first pull-down maintaining unit 141 is inputted with the nth inverting clock signal CKB(n) of the low potential, i.e. the first inverter is inputted with the nth inverting clock signal CKB(n) of the low potential, the third switch transistor T51 is turned off so as to turn off the fifth switch transistor T53. That is, the first inverter does not work so as to turn off the first switch transistor T32 and the second switch transistor T42.

The second pull-down maintaining unit 142 comprises a seventh switch transistor T33 and an eighth switch transistor T43; the second pull-down maintaining unit 142 is employed to control the seventh switch transistor T33 to turn on according to the nth stage non-inverting clock signal CK(n) of the high potential, so as to maintain the nth stage gate drive signal G(n) at the low potential, and to control the eighth switch transistor T43 to turn on to maintain the pull-up control signal Q(n) at the low potential; and to control the seventh switch transistor T33 and the eighth switch transistor T43 to turn off according to the nth stage non-inverting clock signal CK(n) of the low potential.

Specifically, the second pull-down maintaining unit 142 further comprises a ninth switch transistor T61, a tenth switch transistor T62, an eleventh switch transistor T63 and a twelfth switch transistor T64; a drain and a gate of the ninth switch transistor T61 is connected to the nth stage non-inverting clock signal CK(n), a source of the ninth switch transistor T61 is connected to a drain of the tenth switch transistor T62 and a gate of the eleventh switch transistor T63 respectively, and a gate of the tenth switch transistor T62 is connected to the pull-up control signal Q(n), a source of the tenth switch transistor T62 is connected to the first low potential VSSQ; a drain of the eleventh switch transistor T63 is connected to the nth stage non-inverting clock signal CK(n), a source of the eleventh switch transistor T63 is connected to a drain of the twelfth switch transistor T64, a gate of the seventh switch transistor T33 and a gate of the eighth switch transistor T43 respectively, and a gate of the twelfth switch transistor T64 is connected to the pull-up control signal Q(n), a source of the twelfth switch transistor T64 is connected to the first low potential VSSQ; a drain of the seventh switch transistor T33 is connected to the nth stage gate drive signal G(n), a source of the seventh switch transistor T33 is connected to the second low potential VSSG; a drain of the eighth switch transistor T43 is connected to the pull-up control signal Q(n), a source of the eighth switch transistor T43 is connected to the first low potential VSSQ.

Preferably, the ninth switch transistor T61, the tenth switch transistor T62, the eleventh switch transistor T63 and the twelfth switch transistor T64 constitute a second inverter. The second pull-down maintaining unit 142 is inputted with the nth stage non-inverting clock signal CK(n) of the high potential, i.e. the second inverter is inputted with the nth stage non-inverting clock signal CK(n) of the high potential, the ninth switch transistor T61 is turned on so as to turn on the eleventh switch transistor T63. That is, the first inverter works so as to turn on the seventh switch transistor T33 and the eighth switch transistor T43. Then, turning on the seventh switch transistor T33 will maintain the nth stage gate drive signal G(n) at the second low potential VSSG, and turning on the eighth switch transistor T43 will maintain the pull-up control signal Q(n) at the first low potential VSSQ.

When the second pull-down maintaining unit 142 is inputted with the nth non-inverting clock signal CK(n) of the low potential, i.e. the second inverter is inputted with the nth non-inverting clock signal CK(n) of the low potential, the ninth switch transistor T61 is turned off so as to turn off the eleventh switch transistor T63. That is, the second inverter does not work so as to turn off the seventh switch transistor T33 and the eighth switch transistor T43.

This embodiment employs the nth non-inverting clock signal CK(n) and the nth inverting clock signal CKB(n) to realize that the pull-down maintaining module 14 maintains pulling down the nth stage gate drive signal G(n) and the pull-up control signal Q(n) without setting additional signal lines separately to input signals to the pull-down maintaining module 14. While maintaining all the functions of the GOA circuit, it prevents the switch transistor in the pull-down maintaining module 14 from working for a long time to generate a bias voltage. The design of the GOA circuit is effectively simplified and the space requirement of the GOA circuit at the frame of the display panel is optimized, thereby diminishing the frame width of the display panel and providing a new possibility for the narrow frame of the display panel.

Figure 2:
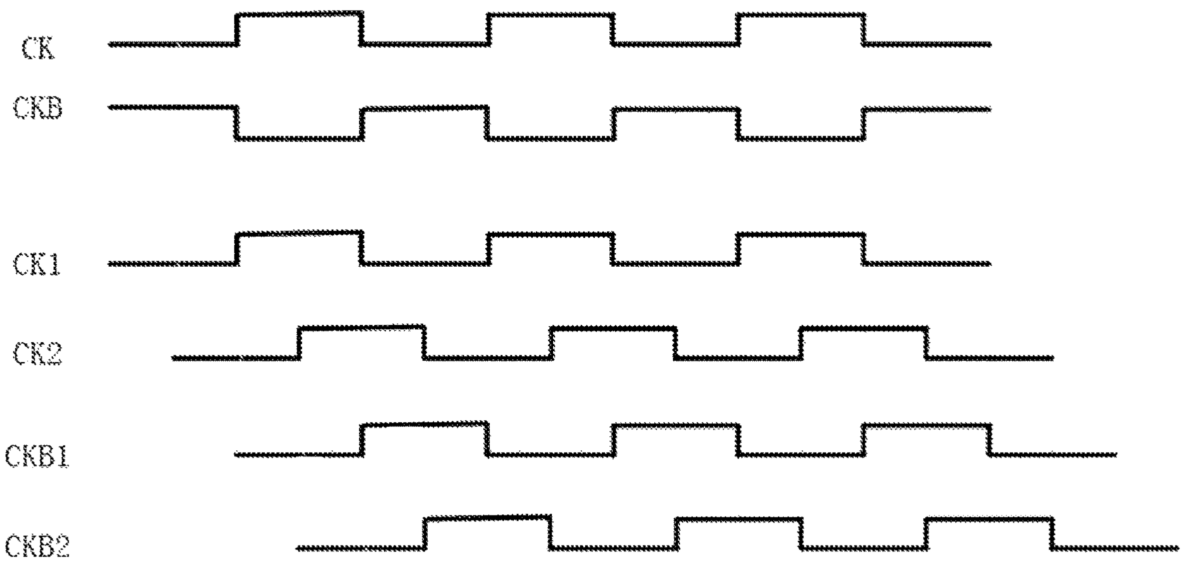
FIG. 2 is a timing diagram of clock signals in the GOA circuit provided by an embodiment of the application.

The present application is applicable to multiple types of cascades. For instance, for the GOA units of N stages, when b=1, the GOA units of N stages are connected in sequence. If n>1, the input end of the nth stage GOA unit is connected to the output end of the n−1th stage GOA unit, and the output end of the nth stage GOA unit is connected to the input end of the n+1th stage GOA unit. If the n=1, the input end of the first stage GOA unit is connected to the start signal STV, i.e. the gate and the drain of the thirteenth switch transistor T11 of the first stage GOA unit are connected to the start signal STV. The GOA circuit comprises two types of clock signal lines, i.e. CK and CKB. When CK outputs the high potential, CKB outputs the low potential; when CK outputs the low potential, CKB outputs the high potential as shown in FIG. 2. The non-inverting clock signal in the GOA unit of each stage is connected to the clock signal line CK, and the inverting clock signal in the GOA unit of each stage is connected to the clock signal line CKB, so as to ensure that CK and CKB alternately output the high potential to the pull-down maintaining module in the GOA unit of each stage.

For the GOA units of N stages, when b=2, the GOA units of odd stages are connected in sequence, and the GOA units of even stages are connected in sequence. If n>2, the input end of the nth stage GOA unit is connected to the output end of the n−2th stage GOA unit, and the output end of the nth stage GOA unit is connected to the input end of the n+2th stage GOA unit. If n=1, 2, then the input ends of the first stage GOA unit and the second stage GOA unit are connected to the start signal STV. The GOA circuit comprises four types of clock signal lines, i.e. CK1, CKB1, CK2 and CKB2. When CK1 outputs the high potential, CKB1 outputs the low potential, and when CK1 outputs the low potential, CKB1 outputs the high potential; When CK2 outputs the high potential, CKB2 outputs the low potential, and when CK2 outputs the low potential, CKB2 outputs the high potential. The timing of CK1 and CK2 outputting the high potential is different, as shown in FIG. 2. The non-inverting clock signal in the GOA unit of odd stage is connected to the clock signal line CK1, and the inverting clock signal in the GOA unit of odd stage is connected to the clock signal line CKB1, so as to ensure that CK1 and CKB1 alternately output the high potential to the pull-down maintaining module in the GOA unit of odd stage. The non-inverting clock signal in the GOA unit of even stage is connected to the clock signal line CK2, and the inverting clock signal in the GOA unit of even stage is connected to the clock signal line CKB2, so as to ensure that CK2 and CKB2 alternately output the high potential to the pull-down maintaining module in the GOA unit of even stage.

Similarly, when b=3, the input end of the nth stage GOA unit is connected to the output end of the n−3th stage GOA unit, and the output end of the nth stage GOA unit is connected to the input end of the n+3th stage GOA unit. The GOA circuit comprises six types of clock signal lines, i.e. CK1, CKB1, CK2, CKB2, CK3, and CKB3. The non-inverting clock signal in the 3i-2th stage GOA unit is connected to the clock signal line CK1, and the inverting clock signal in the 3i-2th stage GOA unit is connected to the clock signal line CKB1; the non-inverting clock signal in the 3i-1th stage GOA unit is connected to the clock signal line CK2, and the inverting clock signal in the 3i-1th stage GOA unit is connected to the clock signal line CKB2; the non-inverting clock signal in the 3ith stage GOA unit is connected to the clock signal line CK3, and the inverting clock signal in the 3ith stage GOA unit is connected to the clock signal line CKB3, and i=1, 2 and 3.

Similarly, when b=4, the input end of the nth stage GOA unit is connected to the output end of the n−4th stage GOA unit, and the output end of the nth stage GOA unit is connected to the input end of the n+4th stage GOA unit. The GOA circuit comprises eight types of clock signal lines, i.e. CK1, CKB1, CK2, CKB2, CK3, CKB3, CK4 and CKB4. The non-inverting clock signal in the 4i-3th stage GOA unit is connected to the clock signal line CK1, and the inverting clock signal in the 4i-3th stage GOA unit is connected to the clock signal line CKB1; the non-inverting clock signal in the 4i-2th stage GOA unit is connected to the clock signal line CK2, and the inverting clock signal in the 4i-2th stage GOA unit is connected to the clock signal line CKB2; the non-inverting clock signal in the 4i-1ith stage GOA unit is connected to the clock signal line CK3, and the inverting clock signal in the 4i-1th stage GOA unit is connected to the clock signal line CKB3; the non-inverting clock signal in the 4ith stage GOA unit is connected to the clock signal line CK4, and the inverting clock signal in the 4ith stage GOA unit is connected to the clock signal line CKB4, and i=1, 2 and 3.

b can also be other values. When b is other values, the number of types of clock signal lines in the GOA circuit, and the connection relationship between the clock signal and the clock signal line in the GOA unit of each stage are similar as aforementioned and will not be described in detail here.

Furthermore, as shown in FIG. 1, the nth stage GOA unit further comprises a reset module 15, and the reset module 15 comprises an eighteenth switch transistor T71; a drain of the eighteenth switch transistor T71 is connected to the pull-up control signal Q(n), a gate of the eighteenth switch transistor T71 is connected to a reset signal Reset, and a source of the eighteenth switch transistor T71 is connected to the first low potential VSSQ.

When the GOA circuit needs to be reset, a reset signal Reset of the high potential is inputted to the reset module 15. The eighteenth switch transistor T71 is turned on to pull down the pull-up control signal Q(n) to the first low potential VSSQ.

In summary, during the scanning period of the embodiment of this application, the pull-up control module outputs a pull-up control signal of a high potential according to a n−bth stage transfer signal and a n−bth stage gate drive signal. The output module outputs a nth stage gate drive signal of the high potential according to the pull-up control signal of the high potential and a nth stage non-inverting clock signal. The pull-down module pulls the pull-up control signal and the nth stage gate drive signal to a low potential according to a n+bth stage gate drive signal when the scanning is completed. The pull-down maintaining module maintains the pull-up control signal and the nth stage gate drive signal at the low potential according to the nth stage non-inverting clock signal and a nth inverting clock signal. There is no need to set a separate signal line for the pull-down maintaining module, thus to simplify the GOA circuit and reduce the space occupied by the GOA circuit to diminish the frame width of the display panel.

The embodiment of the present application further provides a display panel comprising the GOA circuit in the aforesaid embodiments, which will not be described in detail here.

The display panel provided by the embodiment of the present application simplifies the GOA circuit and reduces the space occupied by the GOA circuit to diminish the frame width of the display panel.

In summary, although the above preferred embodiments of the present application are disclosed, the foregoing preferred embodiments are not intended to limit the invention, those skilled in the art can make various kinds of alterations and modifications without departing from the spirit and scope of the present application. Thus, the scope of protection of the present application is defined by the scope of the claims.

What is claimed is:

1. A gate driver on array GOA circuit, comprising a plurality of GOA units, which is cascaded, and a nth stage GOA unit comprises:

a pull-up control module, outputting a pull-up control signal of a high potential according to a n−bth stage transfer signal and a n−bth stage gate drive signal when scanning starts;

an output module, outputting a nth stage gate drive signal of the high potential according to the pull-up control signal of the high potential and a nth stage non-inverting clock signal;

a pull-down module, pulling down the pull-up control signal outputted by the pull-up control module and the nth stage gate drive signal outputted by the output module to a low potential according to a n+bth stage gate drive signal when the scanning is completed; and a pull-down maintaining module, maintaining the pull-up control signal outputted by the pull-up control module and the nth stage gate drive signal outputted by the output module at the low potential according to the nth stage non-inverting clock signal and a nth stage inverting clock signal, wherein the nth stage non-inverting clock signal and the nth stage inverting clock signal are mutually inverted signals.

2. The GOA circuit according to claim 1, wherein the pull-down maintaining module comprises a first pull-down maintaining unit and a second pull-down maintaining unit;

the pull-down maintaining module is further employed to maintain the pull-up control signal and the nth stage gate drive signal at the low potential by the first pull-down maintaining unit when the nth stage non-inverting clock signal is at the low potential, and the nth stage inverting clock signal is at the high potential; and to maintain the pull-up control signal and the nth stage gate drive signal at the low potential by the second pull-down maintaining unit when the nth stage non-inverting clock signal is at the high potential, and the nth stage inverting clock signal is at the low potential.

3. The GOA circuit according to claim 2, wherein the first pull-down maintaining unit comprises a first switch transistor and a second switch transistor;

the first pull-down maintaining unit is employed to control the first switch transistor to turn on according to the nth stage inverting clock signal of the high potential, so as to maintain the nth stage gate drive signal at the low potential, and to control the second switch transistor to be turn on to maintain the pull-up control signal at the low potential; and to control the first switch transistor and the second switch transistor to turn off according to the nth stage inverting clock signal of the low potential.

4. The GOA circuit according to claim 3, wherein the first pull-down maintaining unit further comprises a third switch transistor, a fourth switch transistor, a fifth switch transistor and a sixth switch transistor;

a gate and a drain of the third switch transistor are connected to the nth stage inverting clock signal, a source of the third switch transistor is respectively connected to a drain of the fourth switch transistor and a gate of the fifth switch transistor respectively, and a gate of the fourth switch transistor is connected to the pull-up control signal, a source of the fourth switch transistor is connected to a first low potential, and a drain of the fifth switch transistor is connected to the nth stage inverting clock signal, a source of the fifth switch transistor is connected to a drain of the sixth switch transistor, a gate of the first switch transistor and a gate of the second switch transistor respectively, a source of the sixth switch transistor is connected to the first low potential;

a drain of the first switch transistor is connected to the nth stage gate drive signal, a source of the first switch transistor is connected to a second low potential, and a drain of the second switch transistor is connected to the pull-up control signal, a source of the second switch transistor is connected to the first low potential.

5. The GOA circuit according to claim 2, wherein the second pull-down maintaining unit comprises a seventh switch transistor and an eighth switch transistor;

the second pull-down maintaining unit is employed to control the seventh switch transistor to turn on according to the nth stage non-inverting clock signal of the high potential, so as to maintain the nth stage gate drive signal at the low potential, and to control the eighth switch transistor to turn on to maintain the pull-up control signal at the low potential; and to control the seventh switch transistor and the eighth switch transistor to turn off according to the nth stage non-inverting clock signal of the low potential.

6. The GOA circuit according to claim 5, wherein the second pull-down maintaining unit further comprises a ninth switch transistor, a tenth switch transistor, an eleventh switch transistor and a twelfth switch transistor;

a drain and a gate of the ninth switch transistor is connected to the nth stage non-inverting clock signal, a source of the ninth switch transistor is connected to a drain of the tenth switch transistor and a gate of the eleventh switch transistor respectively, and a gate of the tenth switch transistor is connected to the pull-up control signal, a source of the tenth switch transistor is connected to a first low potential; a drain of the eleventh switch transistor is connected to the nth stage non-inverting clock signal, a source of the eleventh switch transistor is connected to a drain of the twelfth switch transistor, a gate of the seventh switch transistor and a gate of the eighth switch transistor respectively, and a gate of the twelfth switch transistor is connected to the pull-up control signal, a source of the twelfth switch transistor is connected to the first low potential;

a drain of the seventh switch transistor is connected to the nth stage gate drive signal, a source of the seventh switch transistor is connected to a second low potential; a drain of the eighth switch transistor is connected to the pull-up control signal, a source of the eighth switch transistor is connected to the first low potential.

7. The GOA circuit according to claim 1, wherein the pull-up control module comprises a thirteenth switch transistor;

a drain of the thirteenth switch transistor is connected to the n−bth stage gate drive signal, a gate of the thirteenth switch transistor is connected to the n−bth stage transfer signal, a source of the thirteenth switch transistor is connected to the pull-up control signal.

8. The GOA circuit according to claim 1, wherein the output module comprises a fourteenth switch transistor, a fifteenth switch transistor and a bootstrap capacitor;

a drain of the fourteenth switch transistor is connected to the nth stage non-inverting clock signal, a gate of the fourteenth switch transistor is connected to the pull-up control signal, one end of the bootstrap capacitor and the other end of the bootstrap capacitor respectively, a source of the fourteenth switch transistor is connected to the nth stage gate drive signal; a drain of the fifteenth switch transistor is connected to the nth stage non-inverting clock signal, a gate of the fifteenth switch transistor is connected to the pull-up control signal, a source of the fifteenth switch transistor is connected to a nth stage transfer signal.

9. The GOA circuit according to claim 1, wherein the pull-down module comprises a sixteenth switch transistor and a seventeenth switch transistor;

a drain of the sixteenth switch transistor is connected to the nth stage gate drive signal, a gate of the sixteenth switch transistor is connected to a n+bth stage gate drive signal, a source of the sixteenth switch transistor is connected to a second low potential; a drain of the seventeenth switch transistor is connected to the pull-up control signal, a gate of the seventeenth switch transistor is connected to the n+bth stage gate drive signal, a source of the seventeenth switch transistor is connected to a first low potential.

10. A display panel, comprising a gate driver on array GOA circuit, and the GOA circuit comprises a plurality of GOA units, which is cascaded, and a nth stage GOA unit comprises:

a pull-up control module, outputting a pull-up control signal of a high potential according to a n−bth stage transfer signal and a n−bth stage gate drive signal when scanning starts;

an output module, outputting a nth stage gate drive signal of the high potential according to the pull-up control signal of the high potential and a nth stage non-inverting clock signal;

a pull-down module, pulling down the pull-up control signal outputted by the pull-up control module and the nth stage gate drive signal outputted by the output module to a low potential according to a n+bth stage gate drive signal when the scanning is completed; and a pull-down maintaining module, maintaining the pull-up control signal outputted by the pull-up control module and the nth stage gate drive signal outputted by the output module at the low potential according to the nth stage non-inverting clock signal and a nth stage inverting clock signal, wherein the nth stage non-inverting clock signal and the nth stage inverting clock signal are mutually inverted signals.

11. The display panel according to claim 10, wherein the pull-down maintaining module comprises a first pull-down maintaining unit and a second pull-down maintaining unit;

the pull-down maintaining module is further employed to maintain the pull-up control signal and the nth stage gate drive signal at the low potential by the first pull-down maintaining unit when the nth stage non-inverting clock signal is at the low potential, and the nth stage inverting clock signal is at the high potential; and to maintain the pull-up control signal and the nth stage gate drive signal at the low potential by the second pull-down maintaining unit when the nth stage non-inverting clock signal is at the high potential, and the nth stage inverting clock signal is at the low potential.

12. The display panel according to claim 11, wherein the first pull-down maintaining unit comprises a first switch transistor and a second switch transistor;

the first pull-down maintaining unit is employed to control the first switch transistor to turn on according to the nth stage inverting clock signal of the high potential, so as to maintain the nth stage gate drive signal at the low potential, and to control the second switch transistor to be turn on to maintain the pull-up control signal at the low potential; and to control the first switch transistor and the second switch transistor to turn off according to the nth stage inverting clock signal of the low potential.

13. The display panel according to claim 12, wherein the first pull-down maintaining unit further comprises a third switch transistor, a fourth switch transistor, a fifth switch transistor and a sixth switch transistor;

a gate and a drain of the third switch transistor are connected to the nth stage inverting clock signal, a source of the third switch transistor is respectively connected to a drain of the fourth switch transistor and a gate of the fifth switch transistor respectively, and a gate of the fourth switch transistor is connected to the pull-up control signal, a source of the fourth switch transistor is connected to a first low potential, and a drain of the fifth switch transistor is connected to the nth stage inverting clock signal, a source of the fifth switch transistor is connected to a drain of the sixth switch transistor, a gate of the first switch transistor and a gate of the second switch transistor respectively, a source of the sixth switch transistor is connected to the first low potential;

a drain of the first switch transistor is connected to the nth stage gate drive signal, a source of the first switch transistor is connected to a second low potential, and a drain of the second switch transistor is connected to the pull-up control signal, a source of the second switch transistor is connected to the first low potential.

14. The display panel according to claim 11, wherein the second pull-down maintaining unit comprises a seventh switch transistor and an eighth switch transistor;

the second pull-down maintaining unit is employed to control the seventh switch transistor to turn on according to the nth stage non-inverting clock signal of the high potential, so as to maintain the nth stage gate drive signal at the low potential, and to control the eighth switch transistor to turn on to maintain the pull-up control signal at the low potential; and to control the seventh switch transistor and the eighth switch transistor to turn off according to the nth stage non-inverting clock signal of the low potential.

15. The display panel according to claim 14, wherein the second pull-down maintaining unit further comprises a ninth switch transistor, a tenth switch transistor, an eleventh switch transistor and a twelfth switch transistor;

a drain and a gate of the ninth switch transistor is connected to the nth stage non-inverting clock signal, a source of the ninth switch transistor is connected to a drain of the tenth switch transistor and a gate of the eleventh switch transistor respectively, and a gate of the tenth switch transistor is connected to the pull-up control signal, a source of the tenth switch transistor is connected to a first low potential; a drain of the eleventh switch transistor is connected to the nth stage non-inverting clock signal, a source of the eleventh switch transistor is connected to a drain of the twelfth switch transistor, a gate of the seventh switch transistor and a gate of the eighth switch transistor respectively, and a gate of the twelfth switch transistor is connected to the pull-up control signal, a source of the twelfth switch transistor is connected to the first low potential;

a drain of the seventh switch transistor is connected to the nth stage gate drive signal, a source of the seventh switch transistor is connected to a second low potential; a drain of the eighth switch transistor is connected to the pull-up control signal, a source of the eighth switch transistor is connected to the first low potential.

16. The display panel according to claim 10, wherein the pull-up control module comprises a thirteenth switch transistor;

a drain of the thirteenth switch transistor is connected to the n−bth stage gate drive signal, a gate of the thirteenth switch transistor is connected to the n−bth stage transfer signal, a source of the thirteenth switch transistor is connected to the pull-up control signal.

17. The display panel according to claim 10, wherein the output module comprises a fourteenth switch transistor, a fifteenth switch transistor and a bootstrap capacitor;

a drain of the fourteenth switch transistor is connected to the nth stage non-inverting clock signal, a gate of the fourteenth switch transistor is connected to the pull-up control signal, one end of the bootstrap capacitor and the other end of the bootstrap capacitor respectively, a source of the fourteenth switch transistor is connected to the nth stage gate drive signal; a drain of the fifteenth switch transistor is connected to the nth stage non-inverting clock signal, a gate of the fifteenth switch transistor is connected to the pull-up control signal, a source of the fifteenth switch transistor is connected to a nth stage transfer signal.

18. The display panel according to claim 10, wherein the pull-down module comprises a sixteenth switch transistor and a seventeenth switch transistor;

a drain of the sixteenth switch transistor is connected to the nth stage gate drive signal, a gate of the sixteenth switch transistor is connected to a n+bth stage gate drive signal, a source of the sixteenth switch transistor is connected to a second low potential; a drain of the seventeenth switch transistor is connected to the pull-up control signal, a gate of the seventeenth switch transistor is connected to the n+bth stage gate drive signal, a source of the seventeenth switch transistor is connected to a first low potential.

* * * * *